Jan. 19, 1926. 1,570,095
G. STRANDT
GREASE HANDLING METHOD AND MECHANISM
Filed May 12, 1921
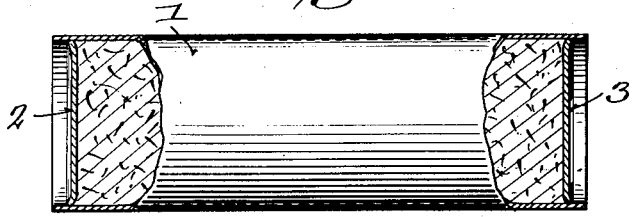
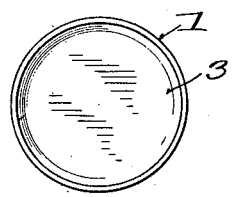
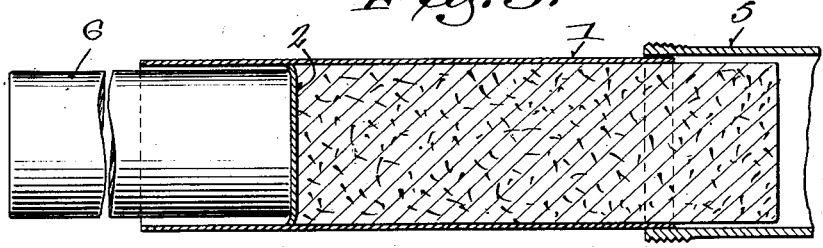
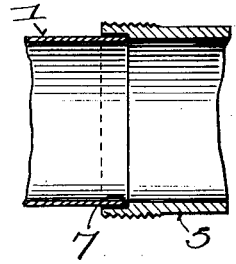
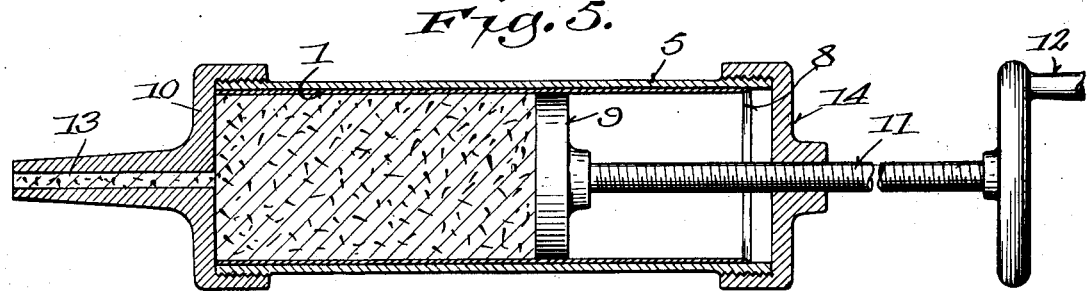
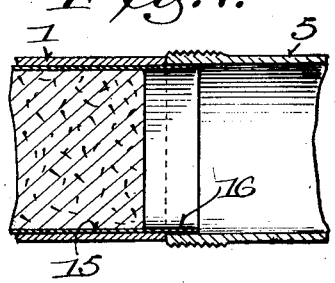
Gustav Strandt INVENTOR.
BY
Erwin Wheeler & Woolard ATTORNEYS.

Patented Jan. 19, 1926.

1,570,095

UNITED STATES PATENT OFFICE.

GUSTAV STRANDT, OF MILWAUKEE, WISCONSIN.

GREASE-HANDLING METHOD AND MECHANISM.

Application filed May 12, 1921. Serial No. 468,823.

*To all whom it may concern:*

Be it known that I, GUSTAV STRANDT, a citizen of the United States, residing at Milwaukee, county of Milwaukee, and State of Wisconsin, have invented new and useful Improvements in Grease-Handling Methods and Mechanism, of which the following is a specification.

This invention relates to a grease handling method and mechanism.

It is the object of this invention to provide means for facilitating the charging of grease guns.

More particularly it is the object of this invention to provide improved grease containers adapted to be used in combination with grease guns, to fill the guns more quickly and easily than has heretofore been possible.

It is a further object of this invention to provide a grease container which will keep the grease clean and free from grit. Grease has hitherto been kept in pails or tins which have in many cases been left open and exposed to grit and dirt of all kinds. The only way of removing dirt which falls into an open pail is to scrape off the whole upper surface of the grease in the pail, thereby wasting large quantities of grease with no assurance that all of the grit has been removed. In the improved containers embodying this invention the grease will be fully protected against all ordinary mishaps and should the surface become dirty, the foreign matter can be removed with a minimum of wastage.

Another object of my invention is to provide means for filling grease guns in a cleanly manner. Grease guns have heretofore been filled in a variety of ways, all of which have ordinarily resulted in smearing the outside of the barrel and the hands of the user with grease making the gun slippery and awkward to handle. In the use of the improved grease handling mechanism embodying this invention, the operation of filling the grease container becomes a factory job and when the container is to be emptied it is adapted to be so associated with the grease gun that the grease may be received bodily into the gun with no inconvenience and without the loss of any grease whatsoever.

In the drawings:

Figure 1 is a view of a grease container to be used in connection with my invention, portions being broken away to expose the grease therein and the retaining caps.

Figure 2 is an end view of the same.

Figure 3 is a longitudinal section thru a container of the form illustrated in Fig. 1 and thru a portion of the barrel of a grease gun, illustrating the manner in which the grease may be delivered from the container to the gun.

Figure 4 is a detail view showing a modified construction of the gun and container.

Figure 5 is a longitudinal section thru a grease gun and grease container embodying a further modification of my invention.

Figure 6 is a modified form of grease container.

Figure 7 is a detail view showing in section the container illustrated in Figure 6 applied to the barrel of a grease gun in preparation for the charging operation.

Like parts are identified by the same reference characters thruout the several views.

My improved method involves the use of cylindrical grease holding cartridges each formed of inexpensive material and each adapted to contain a quantity of grease sufficient to constitute a single charge for a gun of standard dimensions. Containers will be provided in sizes related to the various diameters of standard grease gun barrels to facilitate the charging of the guns.

The containers preferably used are adapted to be filled and capped with similar machinery to that which is in common use for filling and capping milk bottles. The cartridges will first be automatically capped at one end, then filled with grease by a filling machine and finally capped at the other end. The cartridge filling and capping operation is therefore a factory job.

The various means whereby the grease gun barrels may be charged by using containers filled in accordance with the foregoing description will be stated hereinafter. It will be apparent that the novel grease handling method herein set forth may be conveniently considered as involving three steps. The first step is a factory process whereby the containers are mechanically filled in any suitable way by the use of such machinery as is available in the factory but cannot be made in a convenient form for the economical use of individuals. The second step is taken by the customer who uses the grease filled container to charge his grease gun in one of the ways hereinafter to be described. The third step is the use of the gun to deliver lubricant to the desired places in substantially the usual manner, all of the preliminary work having been accomplished in such a way, however, as to leave the barrel free from its usual external coating of dirty grease.

In its simplest form the grease container comprises a cylinder 1 capped at its ends with the disks 2 and 3 which are pressed into place and retain their position thru the frictional engagement of their peripheries with the inner wall of the cylinder or tube 1.

It will be found that the tube 1 may be constructed either of metal or of some non-metallic substance such as cardboard which may be waxed if so desired. In filling the tube with grease, one of the caps or disks 2 is pressed into place in one end of the cylinder. The grease may then be inserted in any approved manner by hand or by machinery and the other cap 3 is pressed into place to close the tube. If desired, the caps 2 and 3 may be sealed by dipping the end of the tube into paraffin or by otherwise applying paraffin to the joint between the caps and the inner wall of the tube. In ordinary service, however, this will not be found necessary. When it is desired to charge a grease gun with grease contained in one of the tubes 1 the cap at the nozzle end of the barrel 5 of the gun is unscrewed; a container of suitable diameter is selected and the cap 3 is pried from one of its ends. The open end is then fitted within the end of the barrel 5. It will be obvious that cylindrical containers 1 of various diameters must be provided to fit telescopically into the barrels of grease guns of standard sizes. A stick or a prepared plunger 6 will now be introduced into the capped end of the container 1 and pressure may be applied to said plunger to force the cap 2 thru the whole length of the tube, thereby discharging into the barrel 5 of the grease gun a full charge of grease.

It will be obvious that in so charging a grease gun, it will be practically impossible for the grease to become gritty or dirty. If this should happen, however, the plunger 6 may be used to force the charge of grease a slight distance out of the container or package 1 whereupon its outer surface may be scraped off with the loss of only a slight amount of grease. It will likewise be practically impossible for any of the grease to come into contact with the exterior surface of the gun barrel 5 or with the hands of the operator. The process is therefore a clean one as well as being remarkably easy of accomplishment.

In Figure 4 there is illustrated a slight modification of this invention in which a special grease gun body or barrel 5 is provided with an interior shoulder 7 adjacent to its end against which the wall of the cylinder 1 is adapted to abut so that the charge of grease delivered from the cylinder 1 into the barrel 5 of the grease gun will exactly fill the gun. It will be understood that if a slightly larger container were selected in the simpler form of the device illustrated in Figure 3 the container might abut against the extreme end of the barrel 5 and the charge of grease would then exactly fill the gun but in this case there would be some danger that the operator might let the package or container 1 slip relatively to the barrel 5 so that some portion of the grease would be discharged upon the outside of the barrel in a position to soil the operator's hands and to make his grasp uncertain. The construction shown in Figure 4 insures the registry of the container 1 with the barrel 5 of the gun and at the same time provides means for keeping the inner walls of both the cylinder and the barrel flush. An additional advantage in this construction is that any desired pressure may be applied by means of plunger 6 and will be communicated directly thru cylinder 1 to the gun barrel 5 instead of tending to cause said cylinder to telescope within the barrel.

In Figure 5, a further modification is shown. In this construction, it will be found advisable (tho not necessary) to make the grease containing cylinder 1 of metal. Its end may be provided with a beveled portion shown at 8. In this form of my invention the cylinder 1 and its contained charge of grease is adapted to be inserted bodily into the barrel 5 of the grease gun. The beveled portion 8 facilitates the entry of the piston 9 of the gun into the cylinder 1. When the container and its charge of grease are in place within the gun the nozzle cap will be screwed into place upon the end of barrel 5 and the piston 9 may be operated by the screw 11 and handle 12 or in any well known and approved manner to expel the grease thru the nozzle 13. It will be understood that in the construction here shown the container 1 operates substantially as a replaceable liner for the grease gun. It is within the scope of this invention to provide a grease container 1 with walls of sufficient thickness to enable them to serve as a barrel 5 for a gun and to be provided with screw threads at its ends to receive the caps 10 and 14. Where grease is sold in this way an initial charge could be made to cover the cost of the container and the empty containers could be returned and exchanged for full ones upon payment of an additional sum sufficient to cover the cost of the grease therein. The cardboard disks or caps 2 and 3 would be used to close a metallic grease container 1 sold in this manner. The purchaser would pry out the sealing disks, screw the plunger cap 14 and nozzle cap 10 into place, and have a grease gun ready for use.

In Figure 6 another modified form of grease container is illustrated. This container comprises a cylinder or tube 1 which may be lined with a thin layer of wax paper 15 flush with the tube at one end and protruding at the other as illustrated. The grease is inserted in the manner already described. The cap 3 is used to close the container and the protruding portion of the lining paper 15 is folded over upon cap 3 as shown at 16. When it is desired to use this form of container for filling the barrel of a grease gun the folded-over paper 16 is unfolded, the cap 3 is removed, and the protruding end of paper 16 may then be inserted into the barrel 5 as shown in Figure 7. In this case, it will be apparent that the tube 1 abuts against the end of barrel 5 and the lining paper 16 extends into the interior of the barrel forming a guide to maintain the tube and barrel in registry, to direct the grease into the barrel, and to prevent any lateral discharge thru the joint between the container 1 and the barrel.

It will be apparent that the devices above described satisfy the several objects of my invention as set forth herein.

I claim:

As a new article of manufacture, a package of grease including a tubular shell, a flexible lining disposed within said shell, and closure caps frictionally retained within said lining, one end margin of said lining being folded over one of said caps and being adapted when distended to comprise a tubular extension beyond said shell to guide the contents of said shell into a grease gun barrel of like diameter.

GUSTAV STRANDT.